United States Patent [19]
Kimura

[11] Patent Number: 6,146,297
[45] Date of Patent: *Nov. 14, 2000

[54] BICYCLE AUTOMATIC SHIFT CONTROL DEVICE WITH VARYING SHIFT SPEEDS

[75] Inventor: Yoshiki Kimura, Shimonoseki, Japan

[73] Assignee: Shimano, Inc., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/141,154

[22] Filed: Aug. 27, 1998

[30] Foreign Application Priority Data

Aug. 28, 1997 [JP] Japan ..................................... 9-232047

[51] Int. Cl.[7] .............................. F16H 59/00; B62M 9/00
[52] U.S. Cl. .............................................. 474/78; 280/238
[58] Field of Search ................................. 474/78, 80, 81, 474/82; 74/336 R, 473.13, 473.14, 473.3; 280/238, 260, 261

[56] References Cited

U.S. PATENT DOCUMENTS

| | | | |
|---|---|---|---|
| 5,213,548 | 5/1993 | Colbert et al. | 474/81 X |
| 5,261,858 | 11/1993 | Browning | 474/78 X |
| 5,266,065 | 11/1993 | Ancarani Restelli | 474/78 |
| 5,483,137 | 1/1996 | Fey et al. | 474/78 X |
| 5,514,041 | 5/1996 | Hsu | 474/80 X |
| 5,621,382 | 4/1997 | Yamamoto | 474/81 |
| 5,681,234 | 10/1997 | Ethington | 474/70 |
| 5,865,454 | 2/1999 | Campagnolo | 474/78 X |

FOREIGN PATENT DOCUMENTS

| | | | |
|---|---|---|---|
| 8-26170 | 1/1996 | Japan | B62M 9/12 |
| 8-112181 | 5/1996 | Japan | B62M 9/12 |
| 8-113182 | 5/1996 | Japan | B62M 9/12 |
| 8-113183 | 5/1996 | Japan | B26M 9/12 |

*Primary Examiner*—David A. Bucci
*Assistant Examiner*—Marcus Charles
*Attorney, Agent, or Firm*—James A. Deland

[57] ABSTRACT

An automatic shift control apparatus for a bicycle transmission includes a shift control mechanism for the bicycle transmission and a bicycle speed receiving mechanism for receiving a bicycle speed. The shift control mechanism commands downshifting of the bicycle transmission from a higher speed step to a lower speed step in response to the bicycle speed and commands upshifting of the bicycle transmission from the lower speed step to the higher speed step in response to the bicycle speed. The shift control mechanism commands the bicycle transmission to shift from the lower speed step to the higher speed step at a first bicycle speed, commands the bicycle transmission to shift from the higher speed step to the lower speed step at a second bicycle speed lower than the first bicycle speed if the bicycle speed does not exceed a third bicycle speed higher than the first bicycle speed after shifting from the lower speed step to the higher speed step, and commands the bicycle transmission to shift from the higher speed step to the lower speed step at a fourth bicycle speed between the first bicycle speed and the third bicycle speed if the bicycle speed exceeds the third bicycle speed after shifting from the lower speed step to the higher speed step. Alternatively, the shift control mechanism commands the bicycle transmission to shift from the higher speed step to the lower speed step at a first bicycle speed, commands the bicycle transmission to shift from the lower speed step to the higher speed step at a second bicycle speed higher than the first bicycle speed if the bicycle speed does not fall below a third bicycle speed lower than the first bicycle speed after shifting from the higher speed step to the lower speed step, and commands the bicycle transmission to shift from the lower speed step to the higher speed step at a fourth bicycle speed between the first bicycle speed and the third bicycle speed if the bicycle speed falls below the third bicycle speed after shifting from the higher speed step to the lower speed step.

15 Claims, 15 Drawing Sheets

| SPEED STEP (VP) | SPEED (T (VP)) TABLE 1 (T1) | SPEED (T (VP)) TABLE 2 (T2) |
|---|---|---|
| 1 | 0 | 0 |
| 2 (2 → 1) | 9 | 12 |
| 3 (3 → 2) | 14 | 17 |
| 4 (4 → 3) | 18 | 21 |
|  | TABLE 3 (T3) | TABLE 4 (T4) |
| 1 (1 → 2) | 11 | 14 |
| 2 (2 → 3) | 16 | 19 |
| 3 (3 → 4) | 20 | 23 |
| 4 | 255 | 255 |
|  | TABLE 5 (T5) | TABLE 6 (T6) |
| 1 | 8 | 0 |
| 2 | 14 | 14 |
| 3 | 17 | 19 |
| 4 | 255 | 23 |

FIG. 4

BICYCLE AUTOMATIC SHIFT CONTROL DEVICE WITH VARYING SHIFT SPEEDS

BACKGROUND OF THE INVENTION

The present invention is directed to control devices for bicycle transmissions and, more particularly, to an automatic shift control device that shifts the bicycle transmission in accordance with the speed of the bicycle.

Known bicycles are equipped with shifting mechanisms (transmissions) that can be shifted into a plurality of speed steps. The shifting mechanisms may be external shifting mechanisms or internal shifting mechanisms. An external shifting mechanism comprises, for example, a hub cog having a plurality of sprockets mounted on the rear wheel and a derailleur for moving a chain between the sprockets. An internal shifting mechanism has the shifting mechanism mounted inside the rear wheel hub. Both types of shifting mechanisms are usually connected with the aid of shifting cables to shift levers attached to handlebars or the like, and the optimum speed step suited to the riding conditions can be selected by manually operating the shift levers.

Shift levers are often placed close to the brake levers on the handlebar. During deceleration, the brake levers and the shift levers must be operated simultaneously. Because of the close proximity of the brake lever and the shifting lever, operation of the shift lever at such times is often impaired. In view of this, a shift control device for automatically switching speed steps in accordance with the speed of a bicycle has been proposed in Japanese Laid-Open Patent Application 8-113131. In this shift control device, the shift timing is varied depending on the magnitude of acceleration or deceleration. The goal is to speed up the shift timing during fast acceleration or deceleration, thus reducing rider discomfort. To construct such a shift control device, acceleration sensors and routines for calculating acceleration on the basis of speed must be provided. Consequently, there is a possibility that complicated automatic shift control will be involved and that the control response will be slower. Control procedures are further complicated because the speed steps must be determined on the basis of complex two-dimensional maps when both speed and acceleration are used. In addition, chattering may occur when rapid acceleration or deceleration occurs near a shift point as a result of the shifting device rapidly shifting back and forth between two adjacent gears.

SUMMARY OF THE INVENTION

The present invention is directed to a bicycle automatic shift control device that uses a relatively simple routine for the shifting operation while eliminating chatter and reducing discomfort for the rider. In general, an upshift mode or a downshift mode is established when a shift is performed, and the shift timing is altered until the bicycle speed exceeds or falls below a speed at which chattering would normally be eliminated. More specifically, the pattern of shift timing is slowed down such that shifting is performed at lower speeds when a downshift is performed in the upshift mode, and at higher speeds when an upshift is performed in the downshift mode. When the bicycle speed exceeds or falls below the speed at which chattering would normally be eliminated, regular shift timing is restored. All this is done on the basis of speed alone, thus resulting in a relatively simple program.

In one embodiment of the present invention, an automatic shift control apparatus for a bicycle transmission includes a shift control mechanism for the bicycle transmission and a bicycle speed receiving mechanism for receiving a bicycle speed. The shift control mechanism commands downshifting of the bicycle transmission from a higher speed step to a lower speed step in response to the bicycle speed and commands upshifting of the bicycle transmission from the lower speed step to the higher speed step in response to the bicycle speed. More specifically, the shift control mechanism commands the bicycle transmission to shift from the lower speed step to the higher speed step at a first bicycle speed, commands the bicycle transmission to shift from the higher speed step to the lower speed step at a second bicycle speed lower than the first bicycle speed if the bicycle speed does not exceed a third bicycle speed higher than the first bicycle speed after shifting from the lower speed step to the higher speed step, and commands the bicycle transmission to shift from the higher speed step to the lower speed step at a fourth bicycle speed between the first bicycle speed and the third bicycle speed if the bicycle speed exceeds the third bicycle speed after shifting from the lower speed step to the higher speed step. In another embodiment, the shift control mechanism commands the bicycle transmission to shift from the higher speed step to the lower speed step at a first bicycle speed, commands the bicycle transmission to shift from the lower speed step to the higher speed step at a second bicycle speed higher than the first bicycle speed if the bicycle speed does not fall below a third bicycle speed lower than the first bicycle speed after shifting from the higher speed step to the lower speed step, and commands the bicycle transmission to shift from the lower speed step to the higher speed step at a fourth bicycle speed between the first bicycle speed and the third bicycle speed if the bicycle speed falls below the third bicycle speed after shifting from the higher speed step to the lower speed step.

In an embodiment which combines the functions of the two embodiments described above, the shift control mechanism includes a downshift mode setting mechanism for setting a downshift mode in response to the shift control mechanism commanding the bicycle transmission to shift from the higher speed step to the lower speed step and an upshift mode setting mechanism for setting an upshift mode in response to the shift control mechanism commanding the bicycle transmission to shift from the lower speed step to the higher speed step. The shift control mechanism commands the bicycle transmission to shift from the higher speed step to the lower speed step at a first bicycle speed when the upshift mode setting mechanism is in the upshift mode, and the shift control mechanism commands the bicycle transmission to shift from the higher speed step to the lower speed step at a second bicycle speed when the upshift mode setting mechanism is not in the upshift mode. Additionally, the shift control mechanism commands the bicycle transmission to shift from the lower speed step to the higher speed step at a third bicycle speed when the downshift mode setting mechanism is in the downshift mode, and the shift control mechanism commands the bicycle transmission to shift from the lower speed step to the higher speed step at a fourth bicycle speed when the downshift mode setting mechanism is not in the downshift mode. The first bicycle speed is different from (e.g., lower than) the second bicycle speed, and the third bicycle speed is different (e.g., higher than) the fourth bicycle speed. The upshift mode setting mechanism cancels the upshift mode when the bicycle speed exceeds a fifth bicycle speed higher than the second bicycle speed, and the downshift mode setting mechanism cancels the downshift mode when the bicycle speed is lower than a sixth bicycle speed lower than the fourth bicycle speed. This ensures a proper spacing between the shift points to avoid chatter.

BRIEF DESCRIPTION OF THE DRAWINGS

FIG. 4 is a table showing a particular embodiment of speed values used to control the automatic shift control device;

DETAILED DESCRIPTION OF THE EMBODIMENTS

Figure 1:
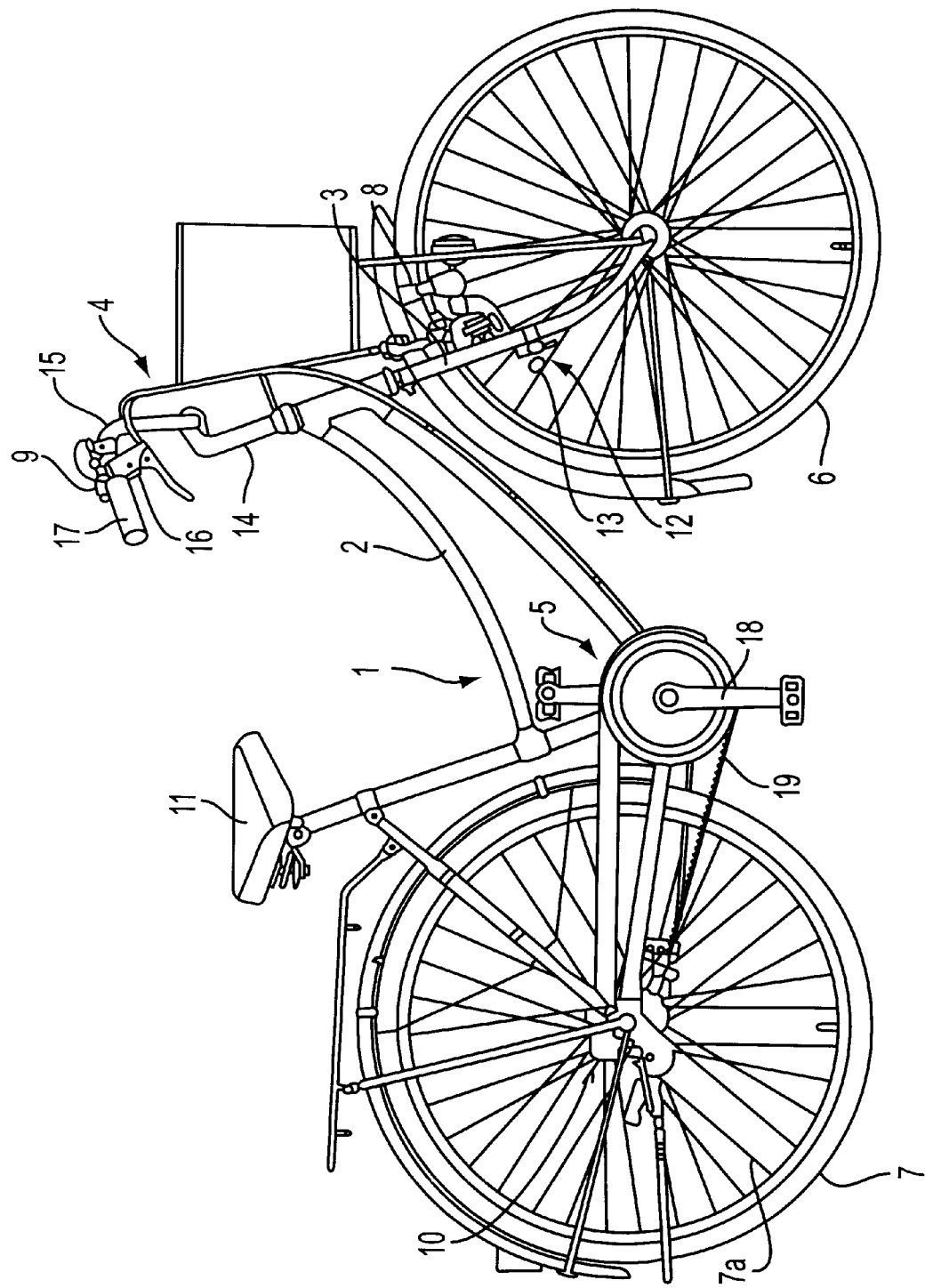
FIG. 1 is a side view of a bicycle which incorporates a particular embodiment of an automatic shift control device according to the present invention.

FIG. 1 is a side view of a bicycle which incorporates a particular embodiment of an automatic shift control device according to the present invention. As shown in FIG. 1, the bicycle in which an embodiment of the present invention is used is a recreational bicycle comprising a frame 1 with a double loop type of frame unit 2; a front fork 3; a drive component 5; a front wheel 6; a rear wheel 7 provided with a four-speed internal shifting hub 10; front and rear brake devices 8 (only the front one is shown in the figure); and a shift control element 9 for conveniently operating the internal shifting hub 10. A saddle 11 and a handle component 4, are attached to the frame 1. Handle component 4 has a handle stem 14 that is fixed to the upper portion of the front fork 3 and a handlebar 15 that is fixed to the handle stem 14. Brake levers 16 and grips 17 that constitute part of the brake devices 8 are mounted at either end of the handlebar 15. A bicycle speed sensor 12 furnished with a bicycle speed sensing lead switch is mounted on the front fork 3. Bicycle speed sensor 12 outputs a bicycle speed signal by sensing a magnet 13 mounted on the front wheel 6. The drive component 5 has a gear crank 18 that is provided to the lower portion (bottom bracket portion) of the frame body 2, a chain 19 that is wrapped around the gear crank 18, and the internal gear hub 10.

Figure 2:
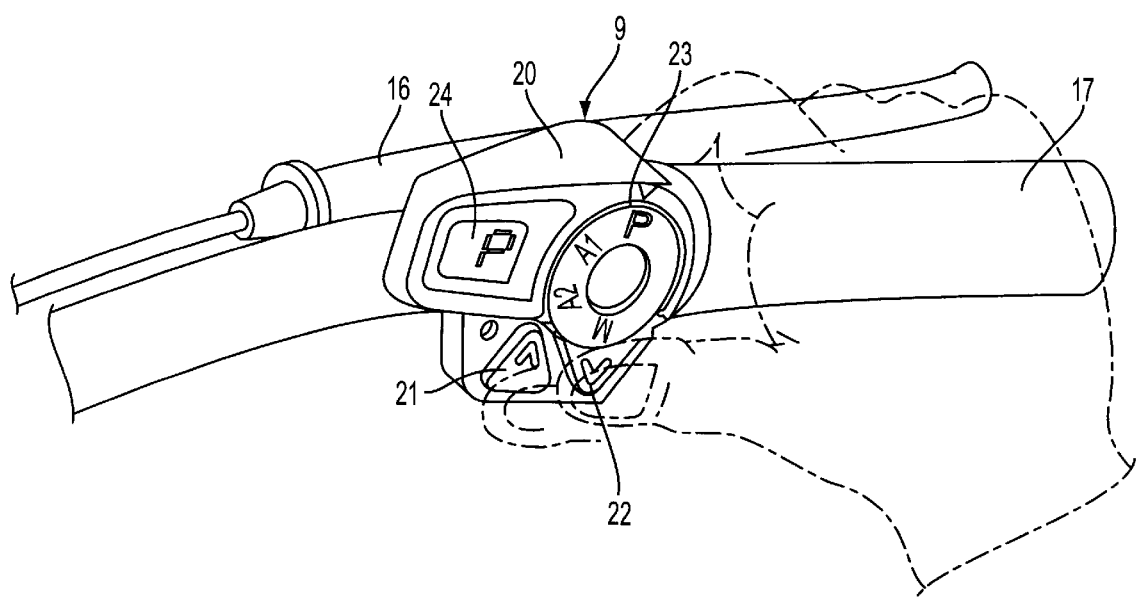
FIG. 2 is an oblique view of a handlebar including a particular embodiment of the manual control unit for the automatic shift control device.

A shift control element 9 is mounted on the right-side brake lever 16. As shown in FIG. 2, the shift control element 9 has a control panel 20 formed integrally with the right-side (front-wheel) brake lever 16, two control buttons 21 and 22 disposed next to each other to the left and right on the lower portion of the control panel 20, a control dial 23 disposed above the control buttons 21 and 22, and a liquid-crystal display component 24 disposed to the left of the control dial 23.

The control buttons 21 and 22 are triangular push buttons. The control button 21 on the left side is a button for performing shifts to a higher speed step from a lower speed step, while the control button 22 on the right side is a button for performing shifts to a lower speed step from a higher speed step. The control dial 23, which is a dial for switching among three shifting modes and a parking mode (P), has four stationary positions: P, A1, A2, and M. The shifting modes comprise an automatic shift 1 (A1) mode, an automatic shift 2 (A2) mode, and a manual shift (M) mode. The parking mode is for locking the internal shifting hub 10 and controlling the rotation of the rear wheel 7. The automatic shift 1 and 2 modes are for automatically shifting the internal shifting hub 10 by means of a bicycle speed signal from the bicycle speed sensor 12. The automatic shift 1 (A1) mode is a shift mode primarily used when automatic shifting is performed on level terrain, and the automatic shift 2 (A2) mode is a shifting mode primarily used when automatic shifting is performed on a slope. The automatic shift 2 (A2) mode is therefore set such that the shift timing for upshifts is faster than in the automatic shift 1 (A1) mode, whereas the shift timing for downshifts is slower than in the automatic shift 1 (A1) mode. The manual shift mode is for shifting the internal shifting hub 10 through the operation of the control buttons 21 and 22. The current riding speed is also displayed on the liquid-crystal display component 24, as is the speed step selected at the time of the shift.

Figure 3:
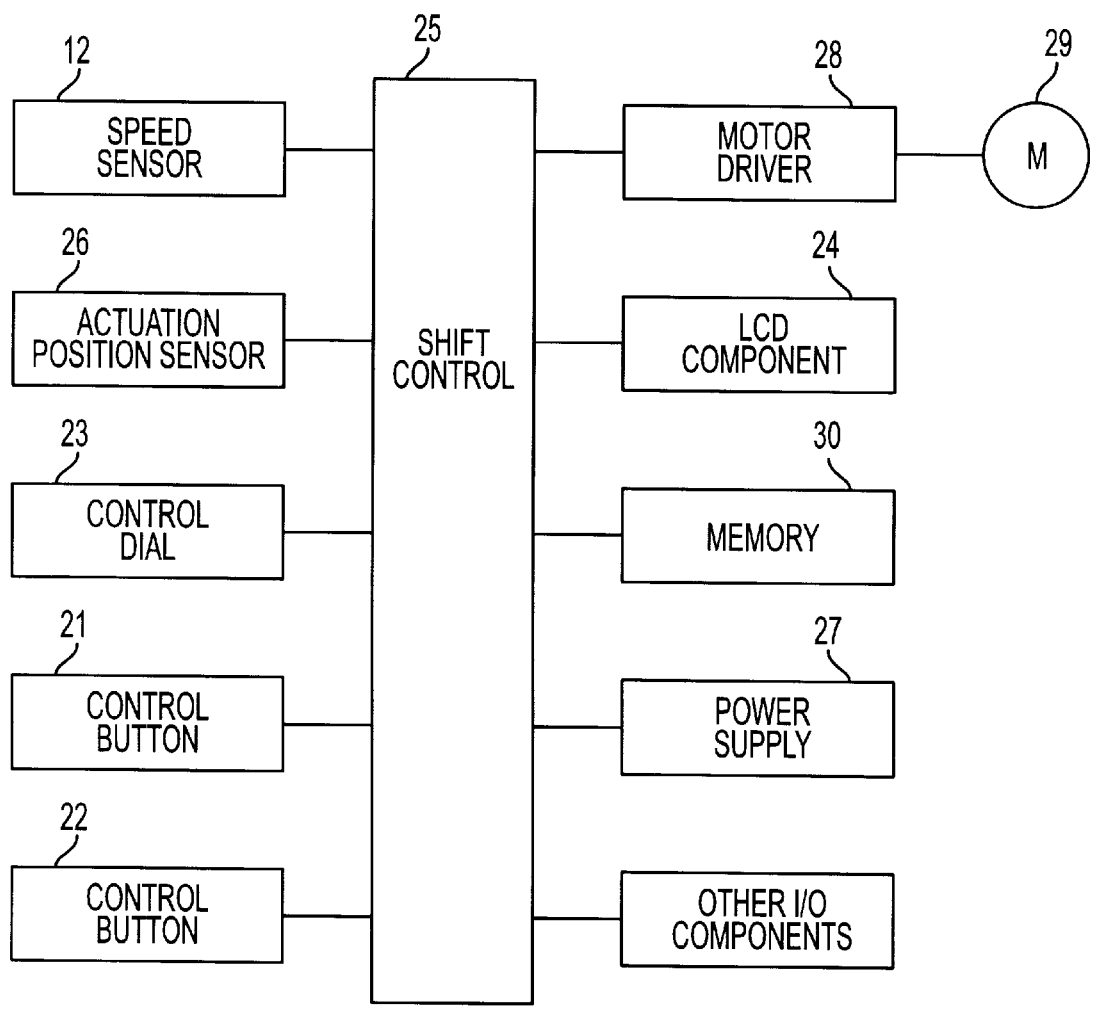
FIG. 3 is a block diagram of a particular embodiment of a control system used in the automatic shift control device.

A shift control unit 25 (FIG. 3) for controlling shifting operations is housed inside the control panel 20. In general, the shift control unit 25 comprises a microcomputer consisting of a CPU, a RAM, a ROM, and an I/O interface. As shown in FIG. 3, the shift control unit 25 is connected to the bicycle speed sensor 12, an actuation position sensor 26 such as a potentiometer that senses the actuation position of the internal shifting hub 10, the control dial 23, and the control buttons 21 and 22. The shift control unit 25 is also connected to a power supply 27 (for example, a battery), a motor driver 28 for driving a motor 29, the liquid-crystal display component 24, a memory component 30, and other input/output components. The memory component 30 may be an EEPROM or another type of rewritable nonvolatile memory. Various types of data, such as the password (PW) described below or the tire diameter, are stored in the memory component 30. Also stored are six types of speed group data (hereinafter "speed tables") expressing respective relations between each speed step and the shifting speeds during the automatic shift 1 (A1) mode and the automatic shift 2 (A2) mode. The shift control unit 25 controls the motor 29 according to the various modes, and it also controls the display of the liquid-crystal display component 24.

FIG. 4 is a table showing a particular embodiment of speed values used to control the automatic shift control device when in automatic shift 1 (A1) mode. More specifically, table 1 is a speed table containing the set speeds that correspond to the downshifted speed steps achieved when an upshift mode described below has been set during the automatic shift 1 (A1) mode, and table 2 is a speed table containing the set speeds that correspond to a regular downshift. Table 3 is a speed table containing the set speeds that correspond to a regular upshift, and table 4 is a speed table containing the set speeds that correspond to upshifting when a downshift mode described below has been set. Furthermore, table 5 is a speed table containing the set speeds which result in canceling the downshift mode, and table 6 is a speed table containing the set speeds which result in canceling the upshift mode. Although the speed tables for the automatic shift 2 (A2) mode are not shown, the values in these tables tend to be lower overall than the corresponding speeds shown in FIG. 4. In each of these tables, the speed data are merely examples, and the numerical values thereof are not limited in any way.

Figure 5:
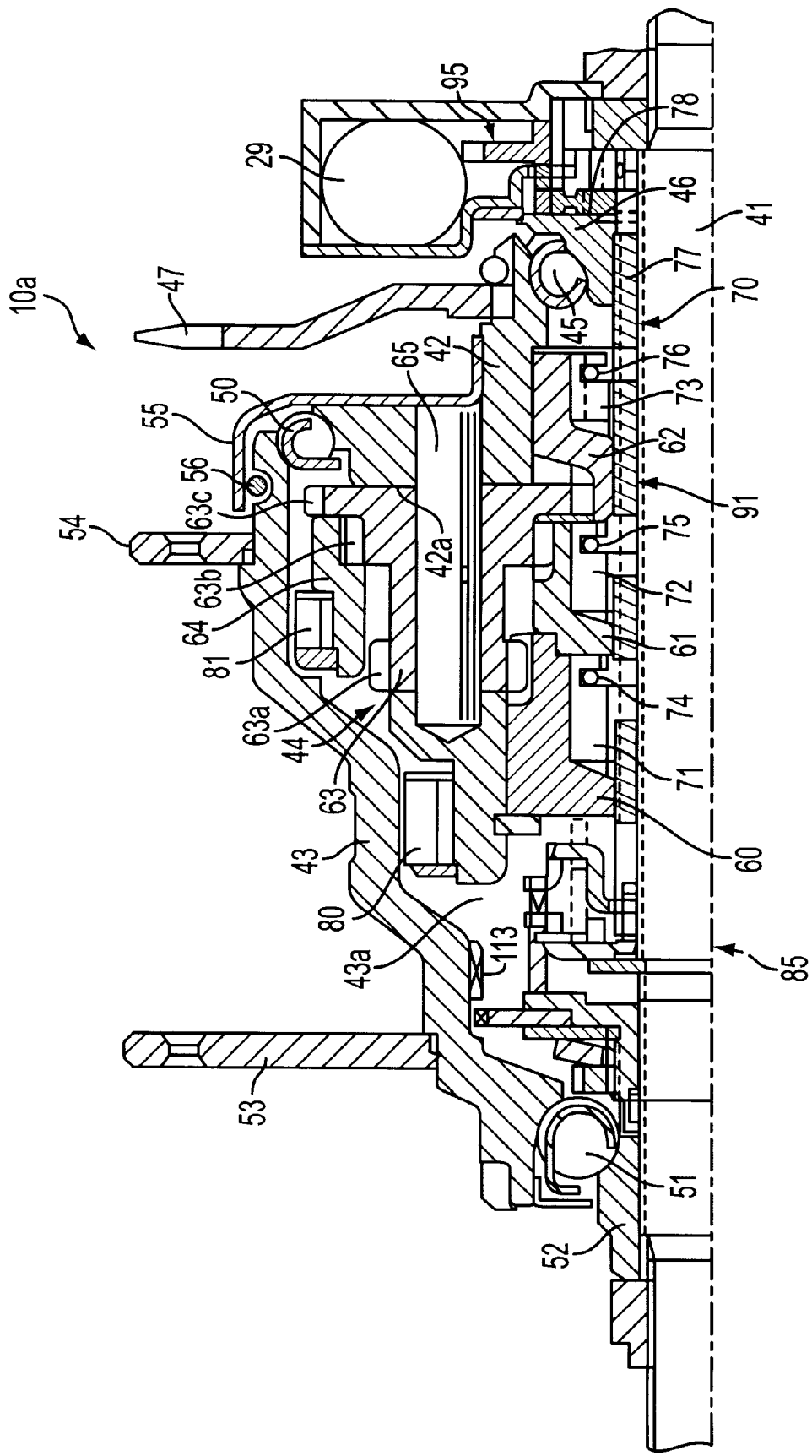
FIG. 5 is a partial cross sectional view of a hub containing a particular embodiment of a bicycle transmission according to the present invention.

As shown in FIG. 5, the internal gear hub 10 primarily has a hub axle 41 that is fixed to the rear portion of the bicycle frame 1, a driver 42 that is located around the outer periphery at one end of the hub axle 41, a hub shell 43 that is located around the outer periphery of the hub axle 41 and driver 42, a planet gear mechanism 44 for transmitting motive power between the driver 42 and the hub shell 43, and an antitheft device 85.

The driver 42 is a roughly cylindrical member, one end of which is rotatably supported by the hub axle 41 via balls 45 and a hub cone 46. A hub cog 47 is fixed as an input element around the outer periphery of driver 42 at one end. A notch 42a that expands outward in the radial direction from the space in the center is formed in the driver 42. Three of these notches 42a are formed at roughly equal angles in the circumferential direction.

The hub shell 43 is a cylindrical member having a plurality of steps in the axial direction, and the driver 42 is housed in a housing space 43a around the inner periphery of hub shell 43. One side of the hub shell 43 is rotatably supported around the outer periphery of the driver 42 via balls 50, and the other side of hub shell 43 ir rotatably supported around the hub axle 41 via balls 51 and a hub cone 52. Flanges 53 and 54 for supporting the spokes 7a (FIG. 1) of the rear wheel 7 are fixed around the outer periphery at both ends of the hub shell 43. A cover 55 is fixed to the outer side wall at one end of the driver 42, and the distal end of the cover 55 extends so as to cover the outer peripheral surface at one end of the hub shell 43. A scaling member 56 is positioned between the inner peripheral surface at the distal end of the cover 55 and the outer peripheral surface of the hub shell 43.

The planet gear mechanism 44 produces a total of four steps, one direct and three speed-increasing. The planet gear mechanism 44 is housed in the housing space 43a inside the hub shell 43, and it has first, second, and third sun gears 60, 61 and 62, three planet gears 63 (only one planet gear is shown in the figures) that mesh with sun gears 60 to 62, and a ring gear 64. The sun gears 60 to 62 are lined up in the axial direction around the inner periphery of the driver 42 and the outer periphery of the hub axle 41, and they are allowed to rotate relative to the hub axle 41. The planet gears 63 are rotatably supported via a support pin 65 within the notches 42a in the driver 42. A first gear 63a, a second gear 63b, and a third gear 63c are formed integrally with the planet gears 63. The first gear 63a meshes with the first sun gear 60, the second gear 63b meshes with the second sun gear 61, and the third gear 63c meshes with the third sun gear 62. The ring gear 64 is located on the outer peripheral side of the planet gears 63, and inner teeth are formed around the inner periphery. This ring gear 64 meshes with the second gear 63b of the planet gears 63.

Figure 6:
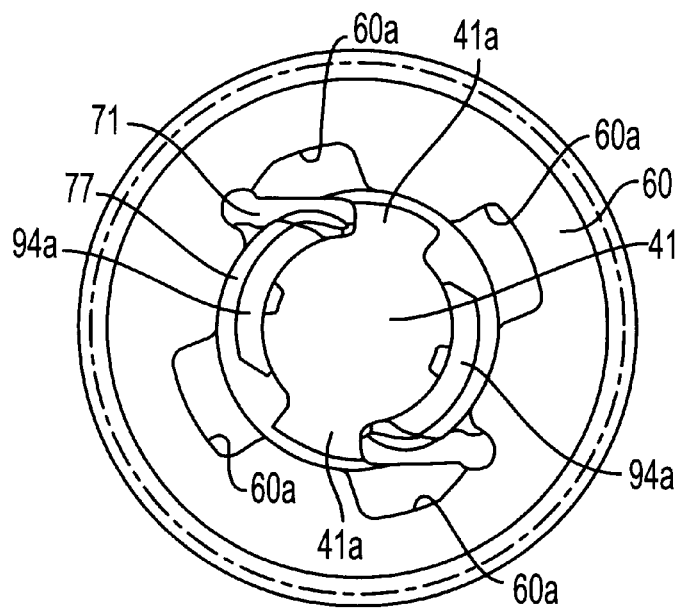
FIG. 6 is a cross sectional view of a sun gear used in the hub shown in FIG. 5.

As shown in FIG. 6, a pair of stopping protrusions 41a are formed at the locations where the sun gears 60 to 62 (sun gear 60 alone is shown in FIG. 6) are disposed around the external peripheral section of the hub axle 41. In addition, four housing spaces 60a to 62a are formed apart from each other in the peripheral direction around the inner periphery of the sun gears 60 to 62. Between the hub axle 41 and the inner periphery of the sun gears 60 to 62 are positioned a selective clutch mechanism 70 for preventing the sun gears 60 to 62 from performing relative rotation in the forward direction or for allowing them to rotate relative to the hub axle 41, and an actuation mechanism 91 for actuating the selective clutch mechanism 70, as shown in FIG. 5.

The selective clutch mechanism 70 has a function whereby it selectively links one of the three sun gears 60 to 62 to the hub axle 41, and a function whereby it does not link any of the sun gears 60 to 62 to the hub axle 41. The selective clutch mechanism 70 has a plurality of drive pawls 71, 72, and 73 whose distal ends can mesh with the stopping protrusions 41a of the hub axle 41. Annular wire springs 74, 75, and 76 bias the distal ends of the drive pawls 71 to 73 toward the hub axle 41. The drive pawls 71 to 73 are disposed in two out of the four spaces 60a to 62a for the corresponding sun gears 60 to 62, are swingably supported at their base ends in the facing spaces 60a to 62a, and are able to mesh at their distal ends with the stopping protrusions 41a. When the drive pawls 71 to 73 are stopped by the stopping protrusions 41a of the hub axle 41 and are thereby linked to the hub axle 41, the sun gears 60 to 62 are no longer able to rotate in the forward direction (clockwise in FIG. 6) in relation to the hub axle 41 but can perform relative rotation in the opposite direction (counterclockwise in FIG. 6). When the drive pawls are released, relative rotation is possible in both directions.

The actuation mechanism 91 has a sleeve 77 rotatably fitted over the outer periphery of the hub axle 41. Sleeve 77 has a plurality of drive cam components 94a at the locations where the drive pawls 71 to 73 are disposed on the outer periphery. When these drive cam components 94a strike any of the drive pawls 71 to 73, the struck pawls are raised, and the linkage between the hub axle 41 and the sun gears 60 to 62 is released by these pawls. An operator 78 is fixed to one end of the sleeve 77 so that the sleeve 77 can be rotated by the rotation of the operator 78. The rotation of the sleeve 77 then causes the drive cam components 94a to selectively actuate the drive pawls 71 to 73 so that the linkage of the sun gears 60 to 62 with the hub axle 41 is controlled.

As shown in FIG. 5, a reduction mechanism 95 is linked to the operator 78. The reduction mechanism 95 reduces the speed of rotation of the shift motor 29 and transmits the rotational force to the operator 78. The actuation position sensor 26, which is used to fix the sleeve 77 of the internal shifting hub 10 in one of the actuation positions VP (in one of the shift positions V1 to V4 of the speed steps or in the locked position PK), is disposed inside the reduction mechanism 95.

A first one-way clutch 80 is provided between the inner peripheral surface of the hub shell 43 and the outer peripheral surface at the other end of the driver 42, and a second one-way clutch 81 is provided between the inner peripheral surface of the hub shell 43 and the outer peripheral surface of the ring gear 64. These one-way clutches 80 and 81 are both roller-type, one-way clutches that make it possible to reduce noise during idle running when a shift is made, to soften the shock when a shift is made, and to perform smoother shifting.

When the first sun gear 60 is linked to the hub axle 41 by the shift motor 29, the bicycle is in fourth gear, the rotation provided from the hub cog 47 to the driver 42 is increased by the largest gear ratio (which is determined by the number of teeth on the first sun gear 60, the first gear 63a and second gear 63b of the planet gears 63, and the ring gear 64), and this rotation is transmitted to the hub shell 43 via the second one-way clutch 81. When the second sun gear 61 is selected and linked to the hub axle 41, the bicycle is in third gear, the rotation of the driver 42 is increased by a medium (the second largest) gear ratio (which is determined by the number of teeth on the second sun gear 61, the second gear 63b of the planet gears 63, and the ring gear 64), and this rotation is transmitted to the hub shell 43 via the second one-way clutch 81. When the third sun gear 62 is selected and linked to the hub axle 41, the bicycle is in second gear, the rotation of the driver 42 is increased by the smallest gear ratio (which is determined by the number of teeth on the third sun gear 62, the second gear 63b and third gear 63c of the planet gears 63, and the ring gear 64), and this rotation is transmitted to the hub shell 43 via the second one-way clutch 81. If none of the sun gears 60 through 62 is selected, the first gear is engaged, and the rotation of the driver 42 is transmitted directly to the hub shell 43. Unselected sun gears perform relative rotation in the opposite direction from the forward direction with respect to the hub axle 41. When any one of the sun gears is selected and the speed is increased by the planet gear mechanism 44, the driver 42 and the hub shell 43 perform relative rotation in the direction in which meshing with the first one-way clutch 80 is released.

The antitheft device 85 is provided to the left end (in FIG. 5) of the hub axle 41 within the hub shell 43. As shown in FIGS. 7 to 10, the antitheft device 85 has a spring washer 101 that rotates integrally with the sleeve 77, a moving cam 102, a moving member 103, a moving spring 104, and a lock ring 114. The moving cam 102 is nonrotatably installed while allowed to move axially in relation to the hub axle 41, and the moving member 103 presses against the moving cam 102. The moving spring 104 is disposed in a compressed state between the moving member 103 and a hub cone 52, and the lock ring 114 is pressed against the moving member 103.

The spring washer 101 is a member that is nonrotatably stopped by the sleeve 77, and it has around its outer periphery an engagement tab 105 that strikes the moving cam 102. The moving cam 102 has a cylindrical cam body 106 and a stopping washer 107 that stops the cam body 106 and the hub axle 41 such that they can move in the axial direction but cannot rotate. A cam component 108 that strikes the engagement tab 105 is formed at the right end (in FIG. 9) of the cam body 106. The cam component 108 is formed such that the cam body 106 is moved axially to the right only when the sleeve 77 rotates toward the locked position PK.

Figure 10:
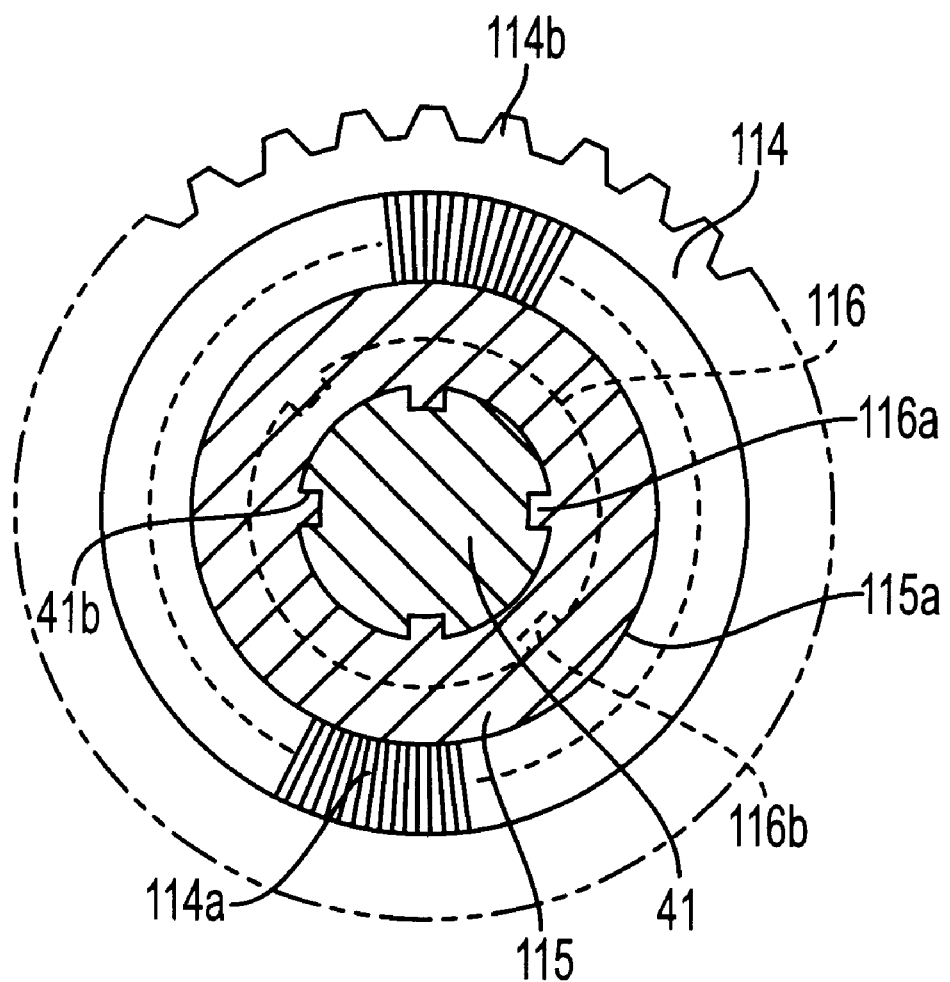
FIG. 10 is a front view of a particular embodiment of a lock ring used in the antitheft device.

The moving member 103 has a disk-shaped flange component 115 and a cylindrical component 116 integrally formed along the inner periphery of the flange component 115. A step 115a is formed on the flange component 115 in its midportion, as viewed in the radial direction, and the lock ring 114 is rotatably supported by the step 115a. As shown in FIG. 10, respective radial irregularities 114a (only those located on the side facing the lock ring 114 are shown) are formed on that surface of the flange component 115 which faces the lock ring 114 and on that surface of the lock ring 114 which faces the flange component 115. The presence of such irregularities 114a increases the frictional force between the lock ring 114 and the moving member 103 and causes these components to vibrate and to produce sound during relative rotation. Serration teeth 114b are formed in the outer peripheral portion of the lock ring 114. These serration teeth 114b can engage with serration teeth 113 formed in the inner peripheral surface of the hub shell 43.

Figure 7:
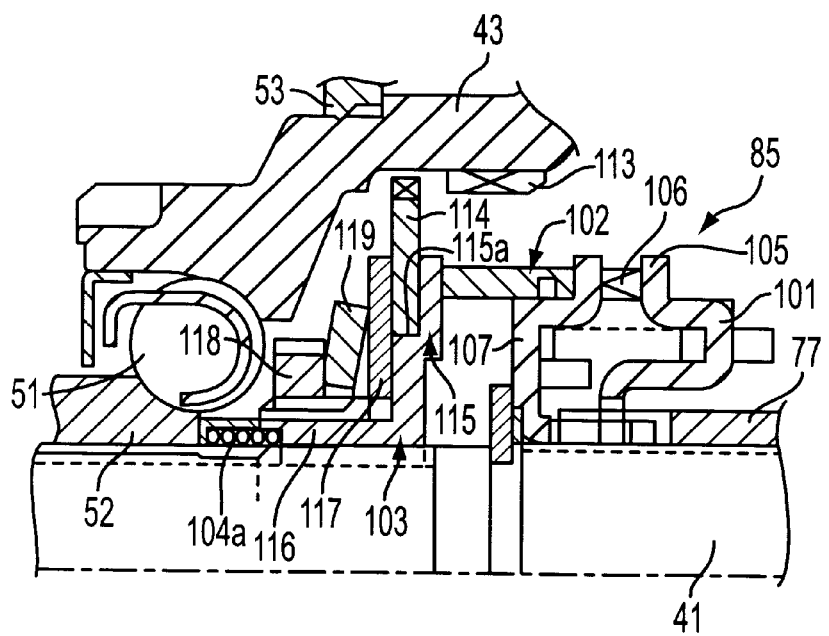
FIG. 7 is an enlarged cross sectional view of the antitheft device used in the hub shown in FIG. 5 during normal riding.
Figure 8:
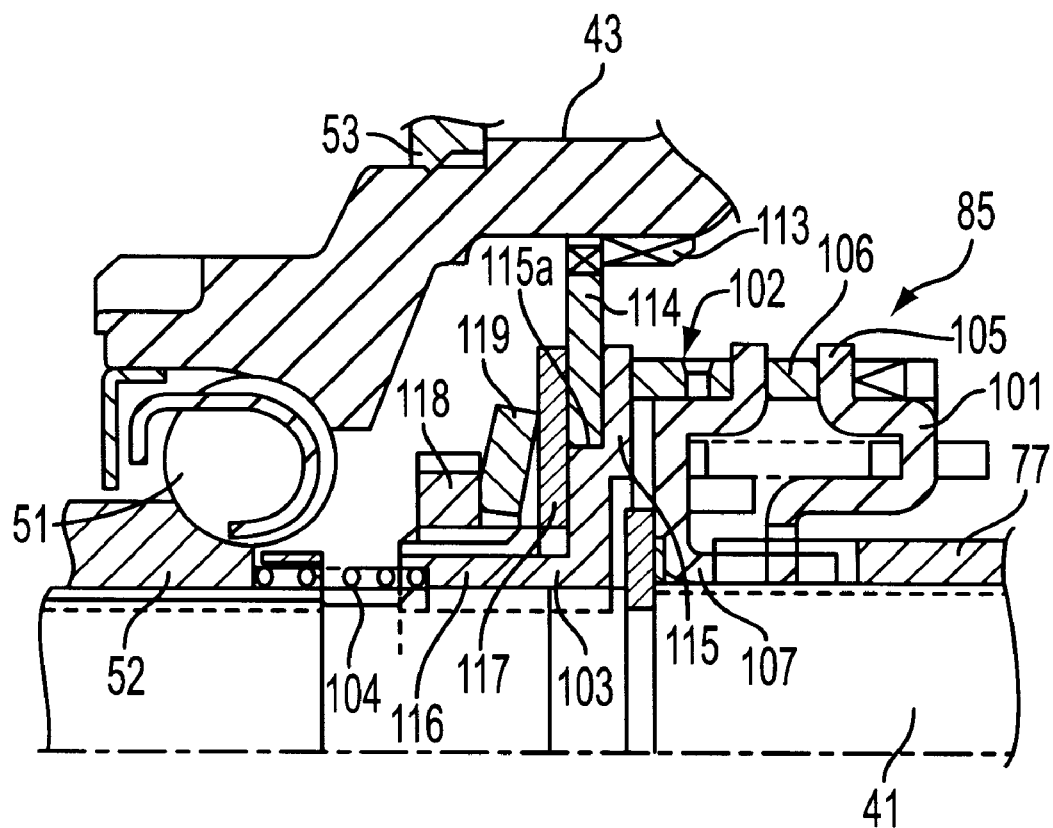
FIG. 8 is an enlarged cross sectional view of the antitheft device used in the hub shown in FIG. 5 in an antitheft state.
Figure 9A:
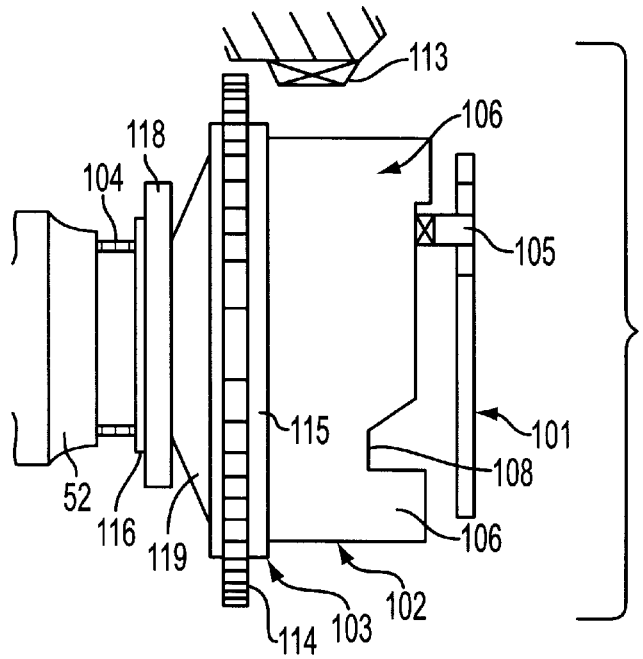
FIG. 9(A) is a component view of the antitheft device during normal riding.
Figure 9B:
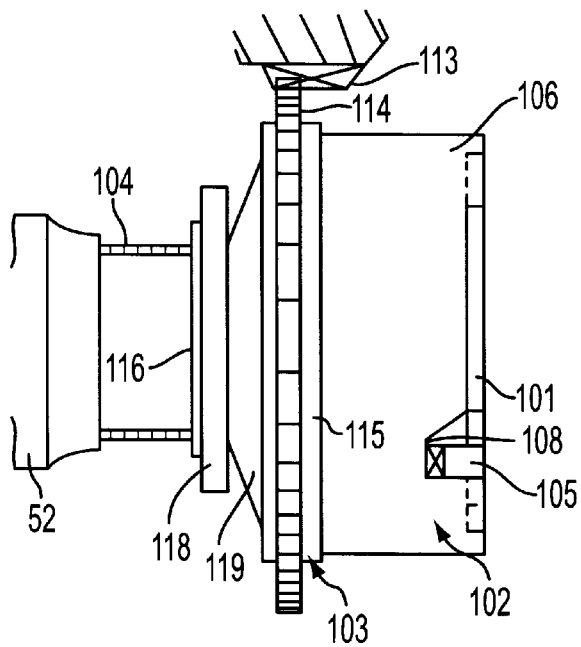
FIG. 9(B) is a component view of the antitheft device in the antitheft state.

Four protrusions 116a are formed on the inner peripheral surface of the cylindrical component 116, as shown in FIG. 10. The protrusions 116a engage four grooves 41b formed in the outer peripheral surface of the hub axle 41. As a result of this arrangement, the moving member 103 is nonrotatably supported by the hub axle 41 while allowed to move in the axial direction. A thread and a stopping groove are formed in the outer peripheral surface of the cylindrical component 116, and a pressure ring 117 is mounted around the outside of the cylindrical component 116, as shown in FIG. 7. The pressure ring 117, which is nonrotatably supported on the cylindrical component 116 while allowed to move in the axial direction, is allowed to come into contact with the lock ring 114. In addition, a pressure nut 118 is screwed on the outer periphery at the right end of the cylindrical component 116. A coned disk spring 119 is disposed between the pressure nut 118 and the pressure ring 117.

The pressure exerted by the coned disk spring 119 can be adjusted by adjusting the fastening of the pressure nut 118; the frictional force between the lock ring 114 and the flange component 115 of the moving member 103 can be adjusted via the pressure ring 117; and the rotation of the hub shell 43 can be controlled arbitrarily. For example, maximizing the frictional force produced by the coned disk spring 119 makes it possible to bring the hub shell 43 into a locked state. Furthermore, reducing the frictional force weakens the force with which the rotation of the hub shell 43 is controlled and allows the hub shell 43 to rotate in relation to the hub axle 41. In this case as well, a frictional force is generated when the coned disk spring 119 is biased, and the rotation is controlled, unlike in a free-rotating state. This embodiment allows the rotation of the hub shell 43 (that is, the rotation of the rear wheel 7) to be freely controlled by adjusting the biasing force of the coned disk spring 119 within a range that extends essentially from a locked state to a free-rotating state.

Shifting and locking are performed by actuating the shift motor 29 through mode selection with the control dial 23 of the shift control element 9 and through shifting with the control buttons 21 and 22, and by rotating the sleeve 77 via the operator 78.

Figure 11:
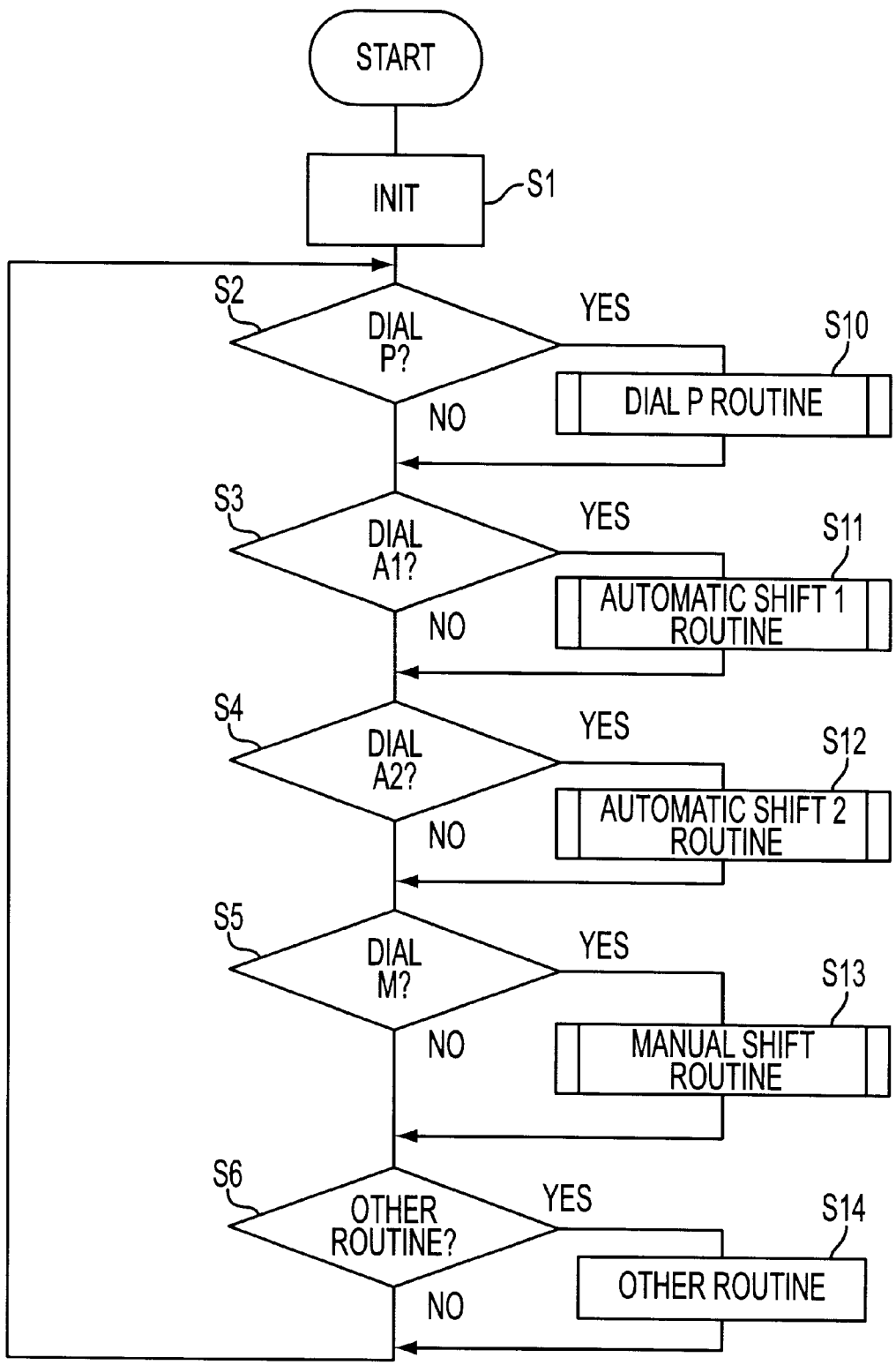
FIG. 11 is a flow chart of a particular embodiment of a main control routine for the automatic shift control device according to the present invention.

FIG. 11 is a flow chart of a particular embodiment of a main control routine for the automatic shift control device according to the present invention. When the power is turned on, initialization is performed in step S1. In this embodiment, circumference data used for calculating speed is set to a diameter of 26 inches, the speed step is set to the second gear (V2), and various flags are reset.

In step S2 a decision is made as to whether the control dial 23 has been set to the parking mode; in step S3 a decision is made as to whether the control dial 23 has been set to the automatic shift 1 mode; in step S4 a decision is made as to whether the control dial 23 has been set to the automatic shift 2 mode; in step S5 a decision is made as to whether the control dial 23 has been set to the manual shift mode; and in step S6 a decision is made as to whether some other routine, such as tire diameter input, has been selected.

Figure 12:
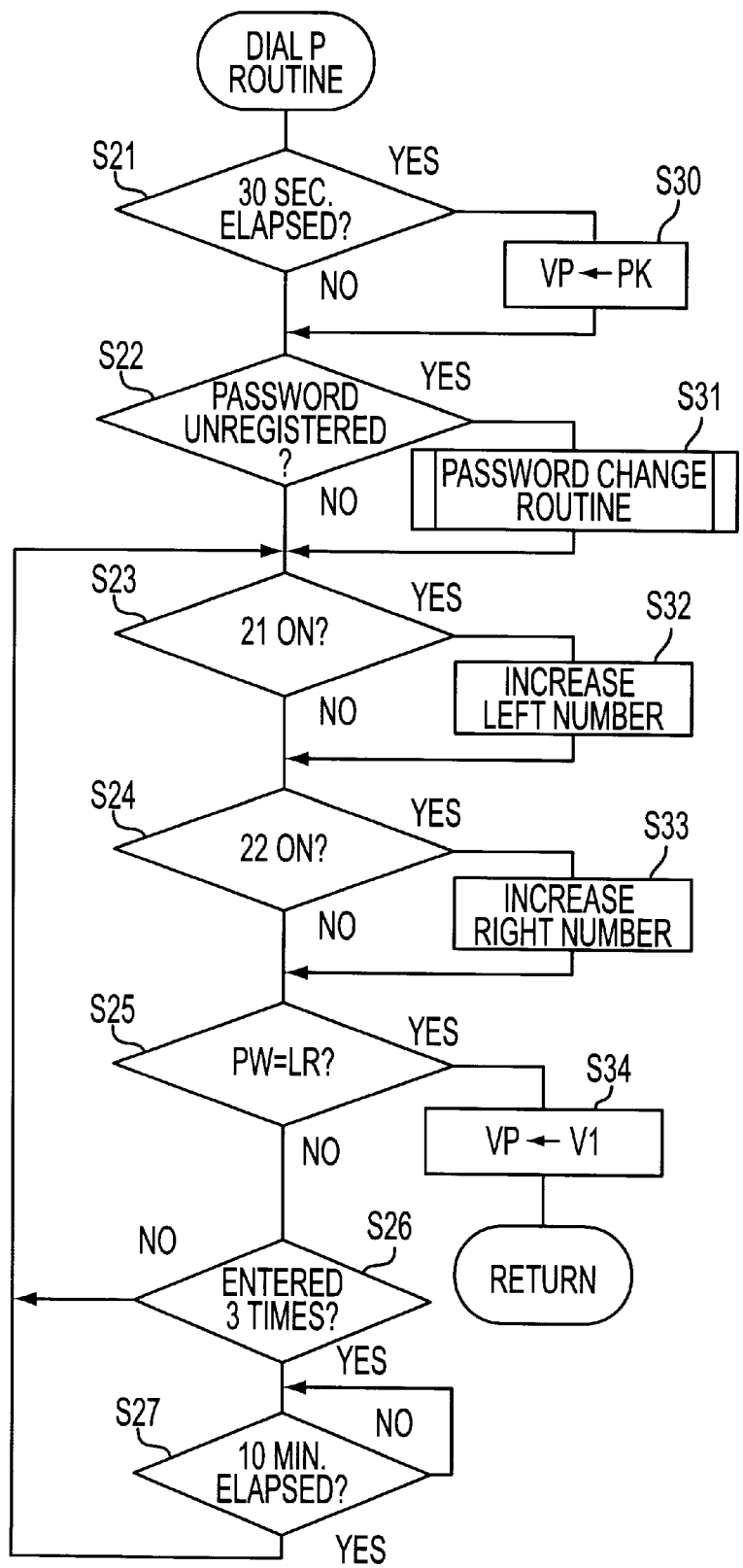
FIG. 12 is a flow chart of a particular embodiment of a parking routine used in the automatic shift control device according to the present invention.
Figure 14:
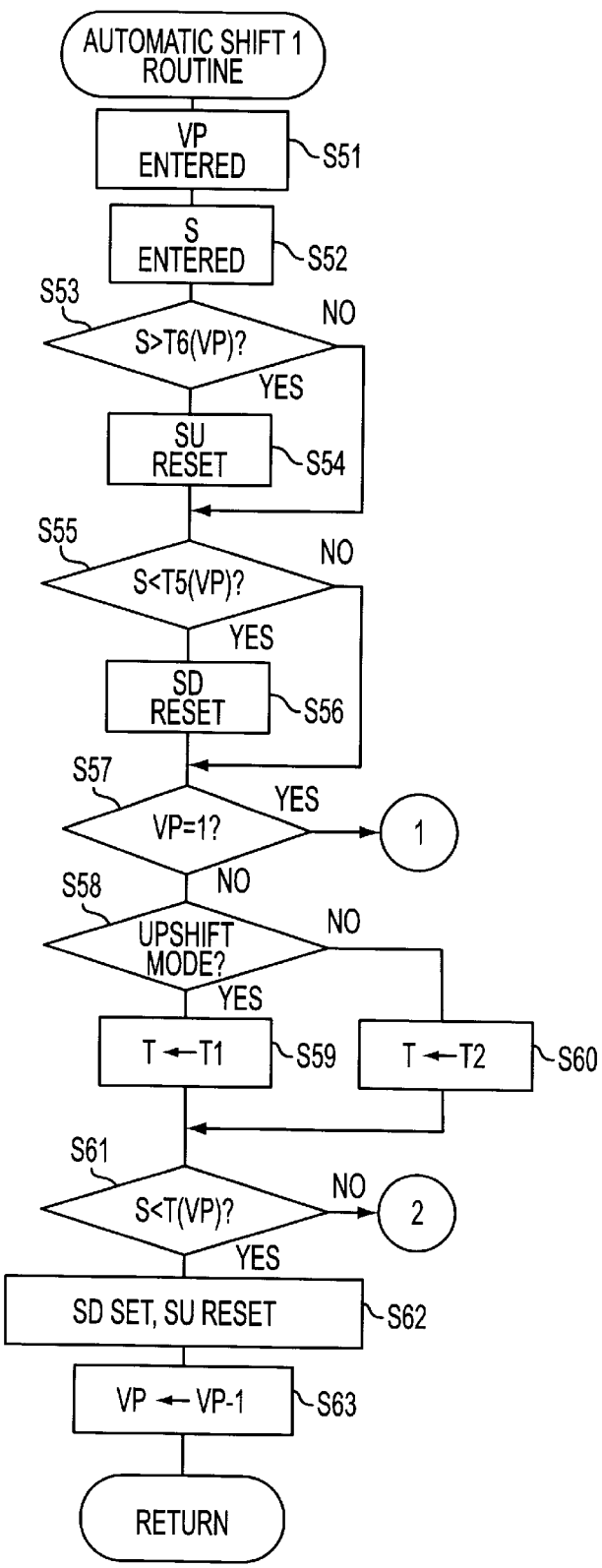
FIG. 14 is a flow chart of a particular embodiment of an automatic shift routine used in the auto shift control device according to the present invention.
Figure 15:
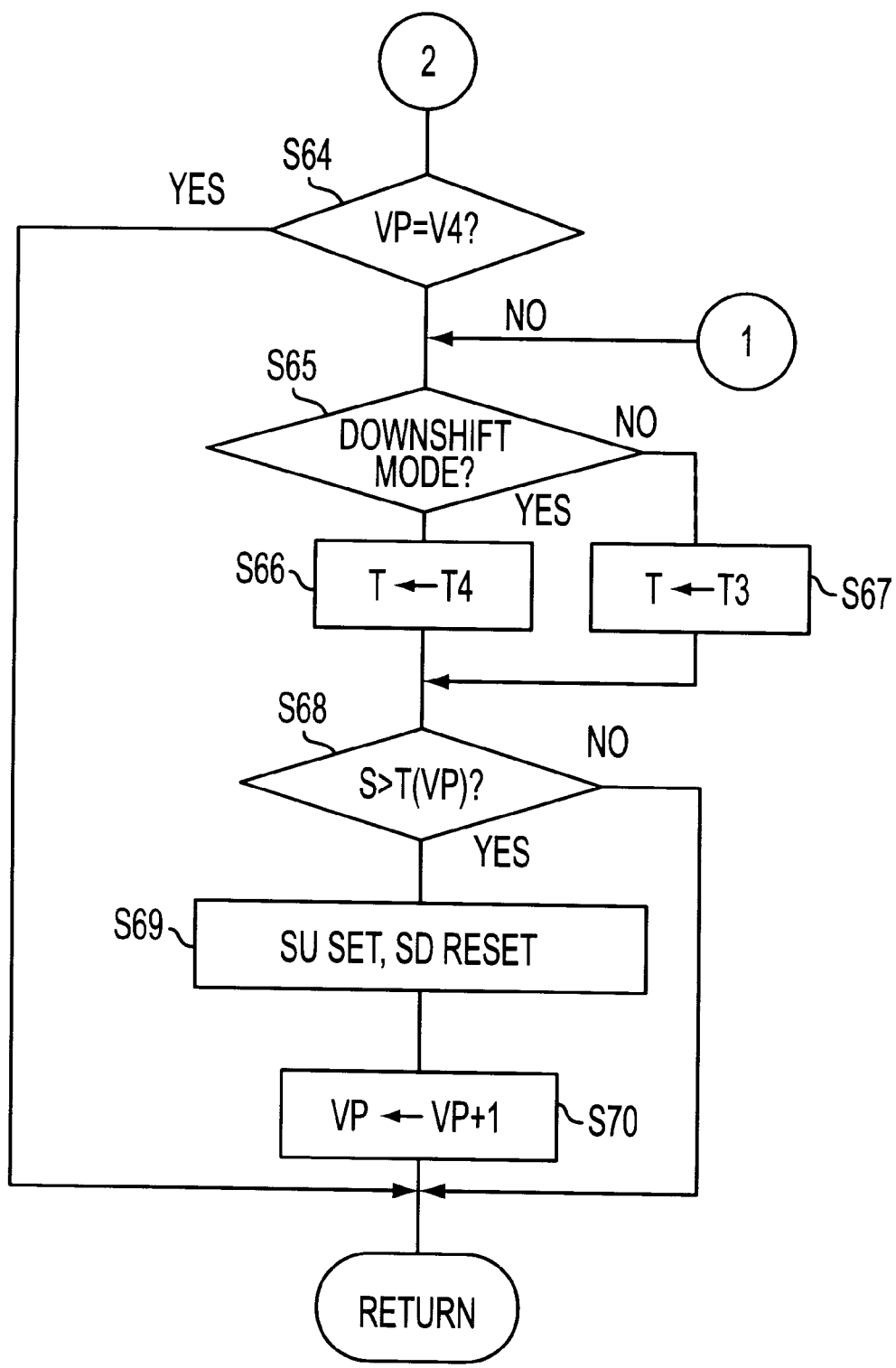
FIG. 15 is a continuation flow chart of the automatic shift routine shown in FIG. 14.
Figure 16:
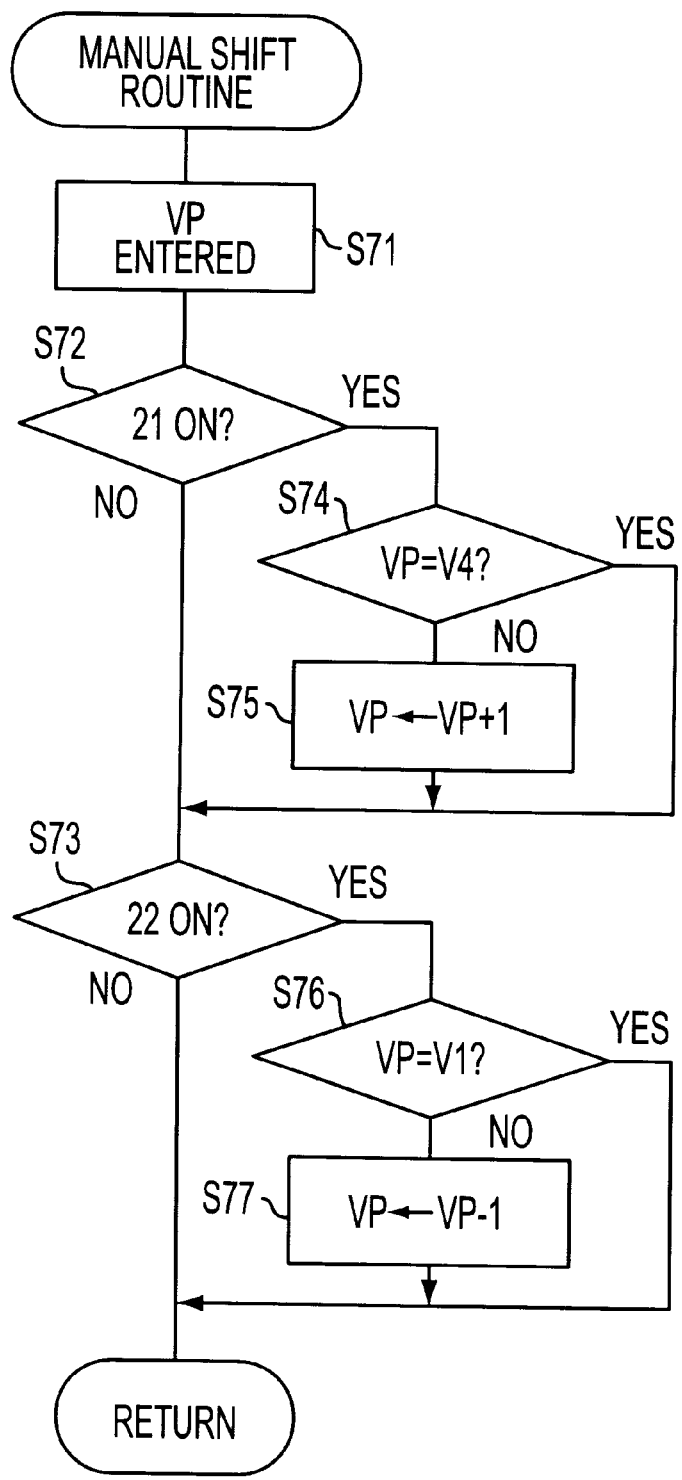
FIG. 16 is a flow chart of a particular embodiment of a manual shift routine used in the automatic shift control device according to the present invention.

When the control dial 23 is turned to position P and is set to the parking mode, the operation proceeds from step S2 to step S10, and the dial P routine shown in FIG. 12 is executed. When the control dial 23 is turned to position A1 and set to the automatic shift 1 mode, the operation proceeds from step S3 to step S11, and the automatic shift 1 routine shown in FIGS. 14 and 15 is executed. When the control dial 23 is turned to position A2 and is set to the automatic shift 2 mode, the operation proceeds from step S4 to step S12, and the automatic shift 2 routine shown is executed in the same manner as the automatic shift 1 routine. When the control dial 23 is turned to position M and is set to the manual shift mode, the operation proceeds from step S5 to step S13, and the manual shift routine shown in FIG. 16 is executed. When another routine is selected, the operation proceeds from step S6 to step S14, and the selected routine is executed.

With the dial P routine shown in FIG. 12, initially a decision is made as to whether 30 seconds have elapsed since the dial was turned to position P in step S21. In step S22, a decision is made as to whether a password PW is unregistered. This decision is made on the basis of whether the password PW has already been stored in the memory component 30. If the password has already been registered, the operation proceeds to step S23. In step S23 a decision is made as to whether the left control button 21 has been operated. The purpose of operating the control buttons 21 and 22 here is to enter the password for unlocking the locked internal shifting hub 10. In step S24 a decision is made as to whether the right control button 22 has been operated, and in step S25 a decision is made as to whether the password LR entered by operation of the two control buttons 21 and 22 matches the registered password PW. If there is no match, the operation proceeds to step S26. In step S26 a decision is made as to whether the password still does not match after it has been entered three times. If it has yet to be entered three times, the operation returns to step S23, and reentering of the password is permitted. If the password does not match the registered password PW after being entered three times, the operation proceeds to step S27. In step S27, the system waits for 10 minutes to pass, and when 10 minutes have elapsed, the operation returns to step S23, and reentering of the password is permitted.

Once 30 seconds have elapsed since the dial was turned to position P, the operation proceeds from step S21 to step S30. In step S30, the shift motor 29 is driven by the motor driver 28, and the actuation position VP is set to the locked position PK. As a result, the sleeve 77 is rotated to the locked position via the operator 78. The engagement tab 105 of the spring washer 101 rotating together with the sleeve 77 moves into the cam component 108a when the sleeve 77 is rotated from a shift position to the locked position PK. When the engagement tab 105 moves into the cam component 108, the moving cam 102 and the moving member 103 biased by the moving spring 104 move to the right from the position shown in FIGS. 7 and 9A to the position shown in FIGS. 8 and 9B. As a result, the serration teeth 114b of the lock ring 114 engage with the serration teeth 113 of the hub shell 43, and the rotation of the hub shell 43 is controlled by the force of friction between the lock ring 114 and the moving member 103. The corresponding frictional force can be altered as needed by adjusting the energizing force of the coned disk spring 119 through the tightening of the pressure nut 118. Therefore, pedaling fails to rotate the rear wheel 7 or is difficult to accomplish.

At this time, an attempt to forcefully turn the hub shell 43 results in the relative rotation of the moving member 103 and the lock ring 114 and causes the lock ring 114 and the moving member 103 to vibrate and to emit a loud vibrating noise under the action of the irregularities 114a. Thus, loud noise is produced when the bicycle is pushed by hand or the pedals are pressed and the hub shell 43 is rotated in the locked state, making the bicycle more difficult to steal. Another feature is that even when the sleeve 77 is mistakenly placed in the locked position by an accidental action during riding, the rear wheel 7 is prevented from being locked abruptly because the rotation of the rear wheel 7 is controlled by friction. In addition, the hub shell 43 is locked by being coupled directly with the hub axle 41, so the rotation of the hub shell 43 (rear wheel 7) is impeded even when an attempt is made to push the bicycle, thus making the bicycle more difficult to move and reducing the likelihood of a theft.

Figure 13:
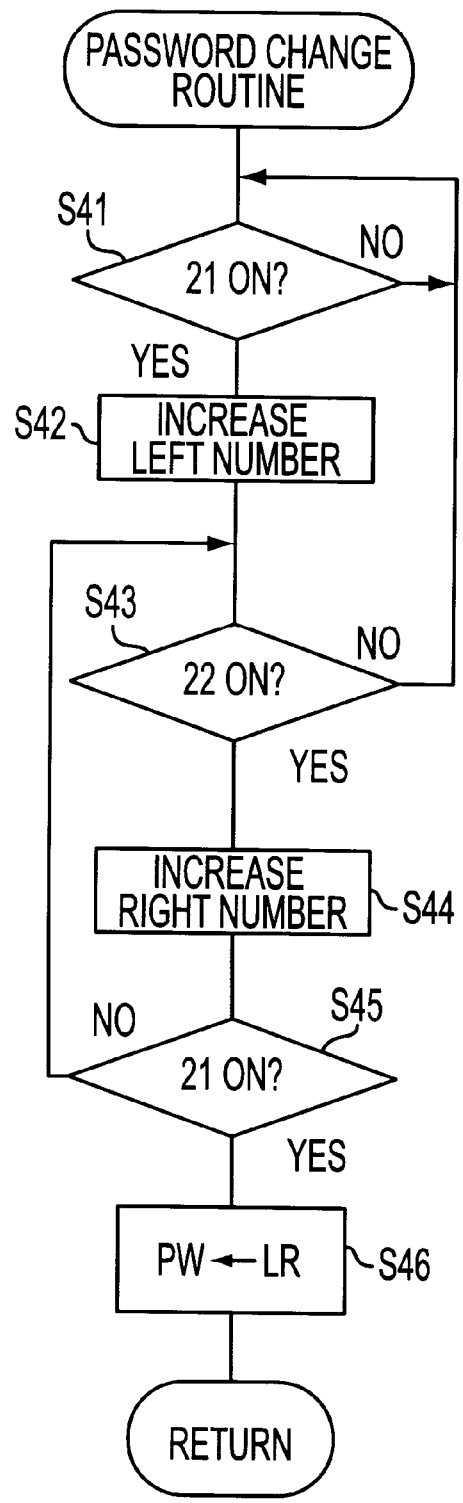
FIG. 13 is a flow chart of a particular embodiment of a password registration routine used in the automatic shift control device according to the present invention.

If the password PW has not been registered, the operation proceeds from step S22 to step S31. In step S31, the password registration routine illustrated in FIG. 13 is executed. As shown in FIG. 13, a decision is first made as to whether the control button 21 has been operated in step S41. If the control button 21 has been operated, the operation proceeds to step S42, and the left number L (a ten-digit number) is increased by one. In step S43 a decision is made as to whether the control button 22 has been operated. If not, the operation returns to step S41 until the control button 22 is pushed, and each time the left number L is increased by one. When the control button 22 is operated, the operation proceeds to step S44, and the right number R (a one-digit number) is increased by one. In step S45 a decision is made as to whether the control button 21 was operated again. If not, the operation returns to step S43 until the control button 21 is operated, and each time the right number R is increased by one. When the control button 21 is operated, the operation proceeds to step S46, and the two-digit inputted number LR is stored as the password PW in the memory component 30. A password PW is thus registered after being selected from among 100 two-digit numbers LR ranging from "00" to "99."

Returning to FIG. 12, the operation proceeds to step S32 if it is decided in step S23 that the control button 21 was operated during unlocking. In step S32 the left number L is increased by one, just as when the password was registered. If it is decided that the control button 22 was operated, the operation proceeds from step S24 to step S33. In step S33, the right number R is increased by one, just as when the password was registered. If the entered number LR matches the password PW in step S25, the operation proceeds to step S34, and the actuation position VP is set to first gear V1. In other words, the sleeve 77 is rotated by the shift motor 29 and positioned at the first gear V1, thus releasing the engagement between the lock ring 114 and the serration teeth 113 of the hub shell 43. Thereafter, when the bicycle is pedaled, the rotation of the driver 42 is transmitted unchanged to the hub shell 43 via the first one-way clutch 80. Processing returns to the main routine in FIG. 11.

In general, with the automatic shift 1 routine of step S11, the actuation position VP is set to the proper speed step corresponding to the bicycle speed SP. In other words, when the current actuation position is different from the proper speed step corresponding to the bicycle speed, shifts are made one gear at a time until the proper speed step is reached. As shown in FIG. 14, the actuation position VP of the actuation position sensor 26 is entered in step S51, and the current bicycle speed S is entered based on the speed signal from the bicycle speed sensor 12 in step S52.

To understand the processing that follows, the upshift mode and the downshift mode will now be described. The upshift mode is a shift mode established when an upshift is made, and the downshift mode is a shift mode established when a downshift is made. Chattering, which involves rapidly alternating upshifts and downshifts, occurs when downshifts are performed at speeds close to those achieved following upshifts and when upshifts are preformed at speeds close to those achieved following downshifts. Slower than usual downshifts are performed in the upshift mode to prevent this phenomenon. Table 1 (T1) is the speed table used when downshifting in the upshift mode, and table 2 (T2) is the speed table used during a regular downshift. Faster than usual upshifts are performed in the downshift mode to prevent chattering during downshifts. Table 4 (T4) is the speed table used when upshifting in the downshift mode, and table 3 (T3) is used during a regular upshift. The two tables 3 and 2 have faster upshift and downshift timing patterns than do tables 4 and 1. Furthermore, table 6 (T6) and table 5 (T5) are speed tables for canceling these upshift and downshift modes and returning to regular shift timing.

In step S53, it is determined whether the current bicycle speed S thus entered exceeds the cancel speed T6 (VP) at the actuation position VP indicating the current speed step in table 6. As mentioned above, table 6 is a speed table for canceling (resetting) the upshift mode, and, as shown in FIG. 4, the corresponding value is, for example, 14 km/h when VP=2. The operation proceeds to step S54 if the bicycle speed S exceeds the cancel speed T6 (VP) of table 6. The upshift flag SU indicating that the operation has been set to the upshift mode is reset during step S54. This procedure is skipped if the bicycle speed S does not exceed the cancel speed T6 (VP) of table 6.

In step S55, it is determined whether or not the bicycle speed S is below a cancel speed T5 (VP) corresponding to a speed step of table 5. As described above, this table 5 is a speed table for canceling (resetting) the downshift mode. As shown in FIG. 4, the value is, for example, 14 km/h when VP=2. The operation proceeds to step S56 if the bicycle speed S is below the cancel speed T5 (VP) of table 5. The downshift flag SD indicating that the operation has been set to a downshift mode is reset during step S56. This procedure is skipped if the bicycle speed S exceeds the cancel speed T6 (VP) of table 6.

In step S57, it is determined whether or not the speed step corresponds to the first gear (whether or not the actuation position is VI). The operation proceeds to step S58 if the speed step does not correspond to the first gear. In step S58, it is determined whether or not the upshift flag SU has been set, that is, whether or not an upshift mode has been established. The operation proceeds to step S59 if the upshift mode has been established, and table 1 (T1) is selected as the downshift speed table. The operation proceeds to step S60 if the upshift mode has not been established, and table 2 (T2) is selected as the downshift speed table.

It is determined during step S61 whether or not the current bicycle speed S is below a shift speed T (VP) corresponding to a speed step of the selected table. In other words, it is determined whether or not the bicycle speed S has dropped below the shift speed corresponding to the current speed step. If the bicycle speed S has dropped below the shift speed, the operation proceeds to step S62, the downshift flag SD is set (i.e., a downshift mode is established), the upshift flag SU is reset, and the upshift mode is canceled. During step S63, the actuation position VP is reduced one level in order to downshift the speed step by one level. The program then returns to the main routine in FIG. 11.

The operation proceeds from step S61 to the step S64 in FIG. 15 if the current bicycle speed S is equal to or greater than a shift speed T (VP) corresponding to a speed step of the selected table. In step S64, it is determined whether or not the actuation position is V4, that is, whether or not the speed step corresponds to the fourth gear. The operation returns to the main routine if the speed step corresponds to the fourth gear. The operation proceeds to step S65 if the speed step does not correspond to the fourth gear, that is, if the speed step corresponds to any of the first through third gears. In step S65, it is determined whether or not a downshift flag SD has already been set up, that is, whether the downshift mode has been established. If the downshift mode has been established, the operation proceeds to step S66, and table 4 (T4) is selected as an upshift speed table. If the downshift mode has not been established, the operation proceeds to step S67, and table 3 (T3) is selected as an upshift speed table. In step S68, it is determined whether or not the current bicycle speed S exceeds a shift speed (VP) corresponding to a speed step of the selected table. In other words, it is determined whether or not the bicycle speed S has risen above the shift speed corresponding to the current speed step. If the bicycle speed S has risen above the shift speed, the operation proceeds to step S69, the upshift flag SU is set (i.e., the upshift mode is established), the downshift flag SD is reset, and the downshift mode is canceled. During step S70, the actuation position VP is raised one level in order to upshift the speed step by one level. The program then returns to the main routine in FIG. 11.

The operation proceeds to step S65 if it was determined during step S57 that the speed step corresponds to the first gear. First gear V1 is usually established because of low speed when the automatic shift 1 routine is performed, that is, when the foot is placed on the pedal, and the bicycle starts moving. When the bicycle starts moving, usually no downshift mode has been established, table 3 is selected, and when the bicycle speed S exceeds 11 km/h, the bicycle transmission is upshifted to second gear V2, and an upshift mode is established. If the bicycle speed S then exceeds 14 km/h, the upshift mode is canceled on the basis of table 6 when the processing returns to step S53. If the bicycle accelerates even further and the bicycle speed exceeds 16 km/h, the speed is upshifted to third gear V3 on the basis of table 3 when processing returns to step S65.

In a reverse case, that is, when the bicycle speed S decreases without exceeding 14 km/h, table 1 is selected after step S58 because the bicycle is still operating in an upshift mode, and no downshift is performed until the speed drops below 9 km/h. On the other hand, when the bicycle speed S continues to decrease after exceeding 14 km/h, table 2 is selected, and no downshift is performed until the speed drops below 12 km/h. Performing a downshift cancels the upshift mode and establishes a downshift mode. The downshift mode is canceled on the basis of table 5 once the bicycle speed S has dropped below 8 km/h. For this reason, an increase in the bicycle speed S from a level of 8 km/h results in the selection of Table 4 and in an upshift at 14 km/h, whereas an increase in the bicycle speed S from a level below 8 km/h results in the selection of table 3 and in an upshift once 11 km/h is exceeded.

Thus, a shift causes the automatic shift 1 routine to enter an upshift mode or a downshift mode, and the shift timing is slowed down in accordance with table 4 or 1 until the speed is increased or reduced to the prescribed cancel speed specified by table 6 or 5, thus making it possible to prevent chattering even when the shift is made prematurely. Smooth speed switching can thus be accomplished with minimal discomfort.

A detailed description of the automatic shift 2 routine will be omitted because the only difference between this routine and the automatic shift 1 routine are the tables used for the routines. Specifically, tables 1 through 6 are set to lower speeds than in the automatic shift 1 routine.

With the manual shift routine of step S13, gear shifts are made one at a time by operation of the control buttons 21 and 22. The manual shift routine is shown in FIG. 16. In step S71 in FIG. 16, the actuation position VP of the actuation position sensor 26 is entered. In step S72, a decision is made as to whether the control button 21 has been operated. In step S73, a decision is made as to whether the control button 22 has been operated. When the control button 21 is operated, the operation proceeds from step S72 to step S74. In step S74, a decision is made as to whether the current actuation position VP is V4, which corresponds to the fourth gear. If the current actuation position VP is not V4, the operation proceeds to step S75, and the actuation position VP is moved one speed step higher, thus executing a one-step upshift. If the current actuation position VP is V4, this routine is skipped.

When the control button 22 is operated, the operation proceeds from step S73 to step S76. In step S76, a decision is made as to whether current actuation position VP is V1, which corresponds to the first gear. If the current actuation position VP is not V1, the operation proceeds to step S77, and the actuation position VP is moved one speed step lower, thus executing a one-step downshift. If the current actuation position VP is V1, this routine is skipped.

The present embodiment thus allows an upshift mode and a downshift mode to be established for the automatic shift 1 routine, with shifting performed in accordance with a slower than usual timing pattern, and chattering prevented, until the speed is raised or lowered to a prescribed level when a shift is performed. As a result, it is possible to perform automatic shifting with minimal discomfort by means of a simple control procedure based on the use of speed alone without the use of acceleration.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Although the above embodiment was described with reference to an internal shifting hub as a shifting mechanism, the present invention is also applicable to a shifting mechanism in the form of an external shifting mechanism composed of a plurality of sprockets and derailleurs. Additionally, although the above embodiment was described with reference to a shifting mechanism actuated by a shifting motor, the present invention is also applicable to a shifting mechanism actuated by a solenoid, an electric/hydraulic/pneumatic cylinder, or another actuator. Thus, the scope of the invention should not be limited by the specific structures disclosed. Instead, the true scope of the invention should be determined by the following claims.

What is claimed is:

1. An automatic shift control apparatus for a bicycle transmission comprising:
   a bicycle speed receiving mechanism for receiving a bicycle speed;
   a shift control mechanism for commanding downshifting of the bicycle transmission from a higher speed step to a lower speed step in response to the bicycle speed and for commanding upshifting of the bicycle transmission from the lower speed step to the higher speed step in response to the bicycle speed;
   a memory;
   a regular mode downshift table stored in the memory and including a plurality of speed step entries associated with a corresponding plurality of regular mode downshift speed entries;
   an upshift mode downshift table stored in the memory and including the plurality of speed step entries associated with a corresponding plurality of upshift mode downshift speed entries;
   an upshift mode setting mechanism for setting an upshift mode in response to the shift control mechanism commanding the bicycle transmission to shift from the lower speed step to the higher speed step;
   wherein the shift control mechanism accesses the upshift mode downshift table and commands the bicycle transmission to shift from the higher speed step to the lower speed step at one of the plurality of upshift mode downshift speed entries when the upshift mode setting mechanism is in the upshift mode;
   wherein the shift control mechanism accesses the regular mode downshift table and commands the bicycle transmission to shift from the higher speed step to the lower speed step at one of the plurality of regular mode downshift speed entries when the upshift mode setting mechanism is not in the upshift mode; and
   wherein the one of the plurality of upshift mode downshift speed entries is different from the one of the plurality of regular mode downshift speed entries.

2. The apparatus according to claim 1 wherein the one of the plurality of upshift mode downshift speed entries is lower than the one of the plurality of regular mode downshift speed entries.

3. The apparatus according to claim 1 wherein the upshift mode setting mechanism cancels the upshift mode when the bicycle speed exceeds an upshift mode cancel bicycle speed higher than the one of the plurality of regular mode downshift speed entries.

4. The apparatus according to claim 3 further comprising an upshift mode cancel table stored in the memory and including the plurality of speed step entries associated with a corresponding plurality of upshift mode cancel bicycle speed entries.

5. The apparatus according to claim 1 wherein the upshift mode setting mechanism cancels the upshift mode when the shift control mechanism commands the bicycle transmission to shift from the higher speed step to the lower speed step.

6. An automatic shift control apparatus for a bicycle transmission comprising:
   a bicycle speed receiving mechanism for receiving a bicycle speed;
   a shift control mechanism for commanding downshifting of the bicycle transmission from a higher speed step to a lower speed step in response to the bicycle speed and for commanding upshifting of the bicycle transmission from the lower speed step to the higher speed step in response to the bicycle speed;
   a memory;
   a regular mode upshift table stored in the memory and including a plurality of speed step entries associated with a corresponding plurality of regular mode upshift speed entries;
   a downshift mode upshift table stored in the memory and including the plurality of speed step entries associated with a corresponding plurality of downshift mode upshift speed entries;

a downshift mode setting mechanism for setting a downshift mode in response to the shift control mechanism commanding the bicycle transmission to shift from the higher speed step to the lower speed step;

wherein the shift control mechanism accesses the downshift mode upshift table and commands the bicycle transmission to shift from the lower speed step to the higher speed step at one of the plurality of downshift mode upshift speed entries when the downshift mode setting mechanism is in the downshift mode;

wherein the shift control mechanism accesses the regular mode upshift table and commands the bicycle transmission to shift from the lower speed step to the higher speed step at one of the plurality of regular mode upshift speed entries when the downshift mode setting mechanism is not in the downshift mode; and wherein the one of the plurality of downshift mode upshift speed entries is different from the one of the plurality of regular mode upshift speed entries.

7. The apparatus according to claim 6 wherein the one of the plurality of downshift mode upshift speed entries is higher than the one of the plurality of regular mode upshift speed entries.

8. The apparatus according to claim 6 wherein the downshift mode setting mechanism cancels the downshift mode when the bicycle speed is lower than a downshift mode cancel speed lower than the one of the plurality of regular mode upshift speed entries.

9. The apparatus according to claim 8 further comprising a downshift mode cancel table stored in the memory and including the plurality of speed step entries associated with a corresponding plurality of downshift mode cancel bicycle speed entries.

10. The apparatus according to claim 6 wherein the downshift mode setting mechanism cancels the downshift mode when the shift control mechanism commands the bicycle transmission to shift from the lower speed step to the higher speed step.

11. An automatic shift control apparatus for a bicycle transmission comprising:

a bicycle speed receiving mechanism for receiving a bicycle speed;

a shift control mechanism for commanding downshifting of the bicycle transmission from a higher speed step to a lower speed step in response to the bicycle speed and for commanding upshifting of the bicycle transmission from the lower speed step to the higher speed step in response to the bicycle speed;

a memory;

a regular mode downshift table stored in the memory and including a plurality of speed stage entries associated with a corresponding plurality of regular mode downshift speed entries;

an upshift mode downshift table stored in the memory and including the plurality of speed stage entries associated with a corresponding plurality of upshift mode downshift speed entries;

a regular mode upshift table stored in the memory and including the plurality of speed step entries associated with a corresponding plurality of regular mode upshift speed entries;

a downshift mode upshift table stored in the memory and including the plurality of speed step entries associated with a corresponding plurality of downshift mode upshift speed entries;

a downshift mode setting mechanism for setting a downshift mode in response to the shift control mechanism commanding the bicycle transmission to shift from the higher speed step to the lower speed step;

an upshift mode setting mechanism for setting an upshift mode in response to the shift control mechanism commanding the bicycle transmission to shift from the lower speed step to the higher speed step;

wherein the shift control mechanism accesses the upshift mode downshift table and commands the bicycle transmission to shift from the higher speed step to the lower speed step at one of the plurality of upshift mode downshift speed entries when the upshift mode setting mechanism is in the upshift mode;

wherein the shift control mechanism accesses the regular mode downshift table and commands the bicycle transmission to shift from the higher speed step to the lower speed step at one of the plurality of regular mode downshift speed entries when the upshift mode setting mechanism is not in the upshift mode;

wherein the shift control mechanism accesses the downshift mode upshift table and commands the bicycle transmission to shift from the lower speed step to the higher speed step at one of the plurality of downshift mode upshift speed entries when the downshift mode setting mechanism is in the downshift mode;

wherein the shift control mechanism accesses the regular mode upshift table and commands the bicycle transmission to shift from the lower speed step to the higher speed step at one of the plurality of regular mode upshift speed entries when the downshift mode setting mechanism is not in the downshift mode;

wherein the one of the plurality of upshift mode downshift speed entries is different from the one of the plurality of regular mode downshift speed entries; and wherein the one of the plurality of downshift mode upshift speed entries is different from the one of the plurality of regular mode upshift speed entries.

12. The apparatus according to claim 11 wherein the one of the plurality of upshift mode downshift speed entries is lower than the one of the plurality of regular mode downshift speed entries, and wherein the one of the plurality of downshift mode upshift speed entries is higher than the one of the plurality of regular mode upshift speed entries.

13. The apparatus according to claim 11 wherein the upshift mode setting mechanism cancels the upshift mode when the bicycle speed exceeds an upshift mode cancel bicycle speed higher than the one of the plurality of regular mode downshift speed entries, and wherein the downshift mode setting mechanism cancels the downshift mode when the bicycle speed is lower than a downshift mode cancel speed lower than the one of the plurality of regular mode upshift speed entries.

14. The apparatus according to claim 13 further comprising:

an upshift mode cancel table stored in the memory and including the plurality of speed step entries associated with a corresponding plurality of upshift mode cancel bicycle speed entries; and a downshift mode cancel table stored in the memory and including the plurality of speed step entries associated with a corresponding plurality of downshift mode cancel bicycle speed entries.

15. The apparatus according to claim 11 wherein the upshift mode setting mechanism cancels the upshift mode when the shift control mechanism commands the bicycle transmission to shift from the higher speed step to the lower speed step, and wherein the downshift mode setting mechanism cancels the downshift mode when the shift control mechanism commands the bicycle transmission to shift from the lower speed step to the higher speed step.

* * * * *